UNITED STATES PATENT OFFICE.

JOHN M. ORDWAY AND GEORGE F. ORDWAY, OF BOSTON, ASSIGNORS OF ONE-FOURTH TO JOSEPH A. ORDWAY, OF WORCESTER, MASS.

PROCESS OF TREATING HIDES OR ANIMAL MEMBRANES AND TISSUES.

SPECIFICATION forming part of Letters Patent No. 255,326, dated March 21, 1882.

Application filed August 8, 1881. (Specimens.)

*To all whom it may concern:*

Be it known that we, JOHN M. ORDWAY and GEO. F. ORDWAY, of Boston, Massachusetts, have invented an Improved Method of Treating Hides; and we hereby declare the following to be a full, clear, and exact description thereof, to enable those skilled in the art to practice it.

The object of our invention is to produce from hides, animal membranes, and like substances a material which will retain the fibrous and membranous characteristics of the hide or membrane, and which will be flexible, elastic, tough, almost imputrescible, and comparatively impervious to moisture, and therefore adapted to a great variety of uses in the arts—such, for instance, as a substitute for whalebone and hard rubber.

Our invention consists in a treatment of hides, well cleaned and all hair removed, and animal membranes, with chromic acid, and then exposing the treated material to the direct action of the sun's light, whereby a new production is had, with the characteristics above named.

In order that those skilled in the art may make and use our invention, we will proceed to describe the manner in which we have carried it out.

We take thoroughly-cleaned and scraped raw hide, either in a wet or dry condition, and immerse it in a moderately-strong solution of bichromate of potash for several hours. The hide is then drained and exposed to the light. The action of the sunlight at once, acting chemically, begins to turn the soaked hide into a darker color. As soon as the hide or membrane has assumed its change of material to the fullest extent the sheet will be found to be a dark-brown color throughout the surface and thickness, and the workman will by this know the sheet has been exposed sufficiently long to the sunlight. Hide one-sixteenth ($\frac{1}{16}$) or one thirty-second ($\frac{1}{32}$) of an inch thick will require about six hours' exposure to a strong sunlight. If the hide be much thicker, it is preferable to give it repeated soakings in the bichromate and exposures to the sunlight, alternated.

We commonly use a cold saturated solution of bichromate of potash; but we do not desire to limit ourselves to proportions, as they may vary somewhat without departing from the spirit of our invention; nor do we confine ourselves to any particular hide or skin, as the intestines and all animal tissues may be treated with our process with the same result.

After the treatment described the sheet is washed in clear water, and then dried thoroughly until it loses all its perceptible moisture, when it will be found to have entirely changed character and become a flexible elastic tough substance, comparatively impervious to moisture, and almost imputrescible, which may be worked to great advantage in many ways in the arts.

We are aware that chromic acid has been used in a variety of ways in the making of leather; but the new substance we produce is in no manner a leather, as no gelatine is produced in the process.

We are also aware that photographers and others have rendered gelatine insoluble by means of treatment with bichromate of potash and subsequent exposure to the sunlight. Gelatine, however, is an amorphous substance formed by the action of boiling water on animal tissues, and hence the action on the gelatine is in the nature of a secondary effect; whereas in the new material made as herein described, the original collagen and fibrine of the tissue combine by the intervention of sunlight with the chromic acid or part of it, as chromic oxide, and is the result of a primary effect, there being no pre-existing gelatine when we commence our treatment.

Having thus described our invention, what we describe as new, and desire to secure by Letters Patent, is—

1. The herein described process for treating hides, animal membranes, and tissues, consisting essentially in impregnating them with a cold nearly-saturated solution containing chromic acid, and then exposing them to sunlight, substantially as and for the purpose set forth.

2. As a new article of manufacture, hides and membranes free from gelatine, having the contained collagen and fibrine chemically combined with chromic acid, substantially as set forth.

JOHN M. ORDWAY.
GEORGE F. ORDWAY.

Witnesses:
HENRY W. WILLIAMS,
JOSEPH ISHBAUGH.